United States Patent Office 2,735,868
Patented Feb. 21, 1956

2,735,868

PRODUCING HALOMETHYL AROMATIC KETONES

Ludo K. Frevel and John W. Hedelund, Midland, Mich., assignors to The Dow Chemical Company, Midland, Mich., a corporation of Delaware No Drawing. Application June 2, 1952,
Serial No. 291,301

8 Claims. (Cl. 260—592)

This invention relates to certain haloaromatic ketones and more particularly to a process for the manufacture of halomethyl aromatic ketones.

Several methods for the preparation of halomethyl aromatic ketones are known in the art. The Friedel-Crafts reaction, usually employed for preparing alpha-haloacetophenones, involves condensing a benzene compound with haloacetyl halide in the presence of metal halide catalyst. However, the Friedel-Crafts reaction is costly since it requires large amounts of catalyst, the recovery of which in the anydrous state is impracticable. Moreover, this reaction is totally unsuitable for the preparation of haloacetophenones from benzene compounds containing reactive nuclear substituents. Even when the substituents are inert to the condensing agent, it is impossible to obtain certain preferred orientations with respect to the haloacetyl group. A process for producing acetophenone by the vapor-phase treatment of vinyl aromatic halohydrins with steam in the presence of basic catalysts is disclosed by Emerson in U. S. Patent 2,394,674. This process, however, removes the beta halogen atom.

The process of the present invention overcomes the objections to the prior art and provides a new, economical, one-step process for the production of halomethyl aromatic ketones, including nuclearly substituted halomethyl aromatic ketones.

According to the invention, dilute nitric acid is reacted with a (1,2-dihaloethyl)benzene compound of the general formula:

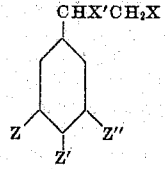

wherein X and X' are independently selected from the group consisting of bromine and chlorine, and Z, Z', and Z'' are independently selected from the group consisting of hydrogen, halogen, alkyl, and alkoxy, each of said alkyl and alkoxy groups containing no more than two carbon atoms.

The halomethyl aromatic ketones prepared according to the process of the invention correspond to the general formula:

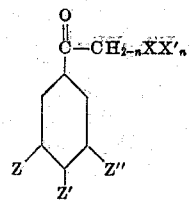

wherein $n$ is an integer from 0 to 1 and X, X', Z, Z', and Z'' are the same as hereinbefore described. These compounds are useful as intermediates in the preparation of antibiotic pharmaceuticals and industrial chemicals. Some of them are lachrymators and may be used per se in tear gases.

The starting compounds which may be used to produce the ketones of the invention are (1,2-dihaloethyl)benzene compounds, such as (1,2-dibromoethyl)benzene ($C_6H_5 \cdot CHBrCH_2Br$) and (1,2-dichloroethyl)benzene ($C_6H_5 \cdot CHClCH_2Cl$). There may also be employed nuclearly substituted (1,2-dihaloethyl) benzene compounds containing certain ring substituents which are inert to the oxidizing action of aqueous nitric acid, e. g. halogen, alkyl, and alkoxy. Typical substituted starting compounds are:

p-(1,2-dibromoethyl)toluene
  (p-$CH_3 \cdot C_6H_4 \cdot CHBrCH_2Br$)
5-(1,2-dichloroethyl)-m-xylene
  (3,5-($CH_3$)$_2 \cdot C_6H_3 \cdot CHClCH_2Cl$)
1-(1,2-dichloroethyl)3-ethylbenzene
  (m-$C_2H_5 \cdot C_6H_4 \cdot CHClCH_2Cl$)
m-(1,2-dibromoethyl)anisole
  (m-$CH_3O \cdot C_6H_4 \cdot CHBrCH_2Br$)
p-(1,2-dichloroethyl)phenetole
  (p-$C_2H_5O \cdot C_6H_4 \cdot CHClCH_2Cl$)
1-bromo-4-(1,2-dibromoethyl)benzene
  (p-Br$\cdot C_6H_4 \cdot CHBrCH_2Br$)
1-chloro-3-(1,2-dichloroethyl)benzene
  (m-Cl$\cdot C_6H_4 \cdot CHClCH_2Cl$)
5-(1,2-dibromoethyl)-1,3-dichlorobenzene
  (3,5-$Cl_2 \cdot C_6H_3 \cdot CHBrCH_2Br$)

According to the invention, halomethyl aromatic ketones are produced by the liquid phase oxidation of the above-described (1,2-dihaloethyl)benzene compounds with aqueous nitric acid. The process is usually carried out batchwise in a reaction vessel resistant to the corrosive action of nitric acid, halogens, and halohydric acids by the gradual addition of nitric acid to a refluxing, well-agitated mixture of a (1,2-dihaloethyl)benzene compound and water. The nitric acid oxidation of (1,2-dihaloethyl)-benzene compounds results in the liberation of halogen. This halogen, if not removed from the reaction zone, tends to add to the terminal carbon atom of the side chain. Hence, either mono- or di-halomethyl aromatic ketones may be prepared as the major products of the reaction depending on whether halogen is removed, as by passing a stream of gas through the reaction mixture. At the preferred conditions of the reaction, the oxidation is readily controlled to give high conversions and yields of the desired ketones.

The process of the invention appears to involve a combined hydrolysis and oxidation reaction wherein a (1,2-dihaloethyl)benzene compound, such as (1,2-dibromomethyl)benzene, is first hydrolyzed in the presence of aqueous nitric acid to form a (1-hydroxy-2-haloethyl)-benzene compound and hydrohalic acid, e. g. alpha-(bromomethyl)benzyl alcohol and hydrobromic acid. These hydrolysis products are then oxidized by the nitric acid to a monohalomethyl aromatic ketone and halogen, such as alpha-bromoacetophenone and bromine. Unless halogen is rapidly and effectively removed from the reaction mixture, as with a stream of gas, the monohalomethyl aromatic ketone, i. e., alpha - bromoacetophenone, is halogenated to the dihalomethyl aromatic ketone i. e., alpha, alpha-dibromoacetophenone.

In carrying out the invention to produce monohalomethyl aromatic ketones, such as $C_6H_5 \cdot COCH_2Br$, the process is conducted to insure removal of halogen from the reaction zone. One may employ as starting materials, the corresponding (1,2-dihaloethyl)benzene compounds, e. g. $C_6H_5 \cdot CHBrCH_2Br$. The over-all equation for this process, using an oxygen-containing gas such as air to rapidly and effectively remove bromine from the reaction mixture is as follows:

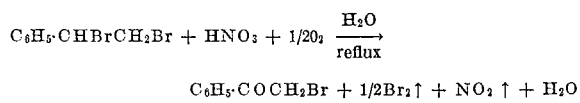

$$C_6H_5 \cdot CHBrCH_2Br + HNO_3 + 1/2O_2 \xrightarrow[\text{reflux}]{H_2O}$$

$$C_6H_5 \cdot COCH_2Br + 1/2Br_2\uparrow + NO_2\uparrow + H_2O$$

In the process, water is necessary to insure the hydrolysis of (1,2-dihaloethyl)benzene compounds to the (1-hydroxy-2-haloethyl)benzene intermediate products. Some reaction according to the invention was obtained when strong nitric acid containing only 30 weight per cent water (and correspondingly not over 70 weight per cent nitric acid) was added to essentially anhydrous (1,2-dibromoethyl)benzene at approximately 100° C. Considerably greater conversions and yields of the desired reaction products were obtained however when more water was employed. It has been found highly desirable to charge water into the reaction vessel in an amount from one to several times the weight of the compound to be oxidized. Besides effecting hydrolysis, water serves several purposes. Water is a diluent and dispersing medium for the oxidizing acid and brings it into intimate contact with the compound to be oxidized during the course of the reaction. Water reflux is also a convenient means for limiting the temperature of the reaction to the desired value.

The reaction may conveniently be carried out at the boiling point of the reaction mixture at the ambient pressure, e. g. the temperature of aqueous reflux at or about 100° C. Temperatures above 50° C. are usually required for the hydrolysis of (1,2-dihaloethyl)benzene compounds and temperatures above 80° C. are preferred. Heating should be terminated as soon as the desired reaction is essentially complete, since prolonged heating beyond this stage causes slow oxidation of the ketones to carboxylic acids.

The process of the invention may also be carried out in the presence of water-immiscible organic solvents such as monochlorobenzene and nitrobenzene which are volatile with steam and inert under the conditions of the reaction. When the compound to be oxidized is a solid at or near the temperature of the reaction, sufficient solvent may be employed to dissolve the organic reactant. When the compound to be oxidized is normally a solid whose melting point is slightly below the temperature of the reaction, e. g. (1,2-dibromoethyl)benzene with a melting point of 74–75° C., it is generally desirable to add only that small amount of solvent which will steam distill and wash back any solid reactant which might otherwise deposit on condensing surfaces during the initial stages of the reaction.

The nitric acid is usually added gradually throughout the reaction, its rate of addition being governed to control the reaction. In making monohalomethyl aromatic ketones, nitric acid may be added as fast as the liberated halogen can be removed from the reacting mixture, e. g. with air. It is generally desirable to add at least one half to one mole of nitric acid per mole of the compound to be oxidized. Somewhat larger quantities of acid may be employed but excessively large amount of acid cause rapid oxidation beyond the desired products of the invention. When water is employed as a diluent as hereinbefore described, commercially available concentrated nitric acid with a specific gravity of about 1.4 is generally used as reagent for the oxidation of (1,2-dihaloethyl)benzene compounds, although acid of greater or lesser concentrations is suitable. Dilute reagent acid only adds unnecessarily to the bulk and heat load requirements of the reacting mixture.

In the process, the hydrolysis of (1,2-dihaloethyl) benzene does not appear to occur immediately upon the first addition of nitric acid to the refluxing mixture of water and the compound to be oxidized. Halogen is not liberated until after the nitric acid has been in contact with the organic reactant for a short period of time. Acidifying the mixture with orthophosphoric acid prior to the addition of nitric acid does not appear to shorten the induction period prior to the liberation of halogen. When evolution of halogen begins, the reaction tends to become quite vigorous. It may be readily controlled by temporarily decreasing or discontinuing the addition of nitric acid and increasing the rate of flow of gas, e. g. air.

As previously explained, when monohalomethyl aromatic ketones are desired reaction products, a sufficiently large stream of gas is blown through the reaction mixture to rapidly and effectively remove liberated halogen. In this way, the tendency of the halogen to react to form the more highly halogenated dihalomethyl aromatic ketones is suppressed. Either an oxygen containing gas, e. g. air, or an inert gas, e. g. nitrogen, is satisfactory for this purpose. However, air is preferred since, in addition to functioning as a purging agent, it also aids in the oxidation of (1,2-dihaloethyl)benzene compounds, probably by converting NO back to NO₂. Other conditions being approximately the same, considerably more (1,2-dihaloethyl)benzene is converted to alpha-(bromomethyl)benzyl alcohol and alpha-bromoacetophenone when air, rather than nitrogen, is employed in the oxidation reaction. When the gas stream is air and less than an equimolar ratio of nitric acid to (1,2-dibromoethyl)benzene is employed, most of the HBr formed during the hydrolysis reaction is also oxidized to bromine and removed from the reaction mixture with the vent gas stream. When nitrogen is employed under similar conditions, the HBr is mostly unoxidized and remains dissolved in the aqueous layer.

When dihalomethyl aromatic ketones, such as alpha, alpha-dibromoacetophenone, are the preferred principal products from the oxidation of (1,2-dihaloethyl)benzene compounds, the reaction mixture is preferably not blown with air or inert gas. Moreover, it is generally desirable to increase the rate of reaction by more rapid addition of nitric acid to the reaction mixture, than is employed in making monohalomethyl aromatic ketones. In this way it is possible to increase the rate at which halogen is liberated and the effective concentration thereof in the reaction mixture.

In carrying out the process of the invention, the optimum conditions for the oxidation of any particular starting material may be easily determined by trial.

The organic products may be worked up in several ways, depending upon their identity and that of the organic solvent, if any, employed in the reaction. It is usually desirable to separate the organic layer and wash it with water to remove any HBr dissolved therein. The reaction products may sometimes be separated from the washed organic layer by fractional distillation, usually at low pressure to offset the thermal instability of these compounds. In other cases, the reaction products are conveniently and more preferably separated by fractional crystallization and purified by recrystallization from organic solvents. The crude filtrate from the fractional crystallization, usually consisting essentially of a (1-hydroxy-2-haloethyl)benzene compound, may be fed back to the reaction vessel for further oxidation. In this manner, most of the organic reactant may be converted to the desired product.

The aforementioned (1-hydroxy-2-haloethyl)benzene compounds which are the initial hydrolysis products in the nitric acid oxidation of (1,2-dihaloethyl)benzene compounds, may themselves be used as starting materials for the production of halomethyl aromatic ketones. The oxidation of (1-hydroxy-2-haloethyl)benzene compounds to the corresponding monohalomethyl aromatic ketones is disclosed in our co-pending application Serial No. 291,302, filed simultaneously herewith.

The present invention is illustrated, but not limited, by the following examples.

*Example 1*

This example illustrates the oxidation of a (1,2-dihaloethyl)benzene preponderantly to a monohalomethyl phenyl ketone.

Into a two-liter, three-neck flask equipped with reflux condenser, air bubbler tube, dropping funnel, thermometer, and motor driven stirrer was charged 512 grams of (1,2-dibromoethyl)benzene ($C_6H_5 \cdot CHBrCH_2Br$) and 500 ml. of water. Approximately 30 ml. of monochlorobenzene was also added to wash back any (1,2-dibromoethyl)benzene which would otherwise deposit in the reflux condenser during the initial stages of the reaction. Heat was applied to the flask and stirring was started when the (1,2-dibromoethyl)benzene melted. The agitated mixture was heated to approximately 100° C. and a stream of air was bubbled through the reaction mixture at a rate of approximately two liters a minute. Concentrated nitric acid of 1.42 specific gravity was then added dropwise into the reaction vessel. When bromine began to evolve, the air rate was increased to four and then five liters a minute in order to remove bromine rapidly from the reaction mixture. A total of 70 ml. of nitric acid was added to the reactants during a period of 95 minutes. Air at 5 liters a minute was passed through the refluxing mixture for 50 minutes after the addition of nitric acid had ceased, whereupon the air flow was reduced to 3 liters for the remainder of the reaction. The total vent gas stream was scrubbed in aqueous sodium hydroxide.

The crude water-washed organic product weighed 384 grams. It was found to contain approximately 49 weight per cent alpha-bromoacetophenone, 3 weight per cent alpha,alpha-dibromoacetophenone, and 48 weight per cent alpha-(bromomethyl)-benzyl alcohol.

The crude organic product was calculated to be equal to approximately 503 grams of (1,2-dibromoethyl)benzene as compared to 512 grams charged. A bromine balance was also obtained by analyzing the washed organic product, the caustic scrubbing solution, and the aqueous nitric acid including water washes for total bromine content by X-ray absorption analysis. The data are listed below:

| | Grams |
|---|---|
| Washed organic product | 153.0 |
| Aqueous nitric acid | 57.8 |
| Caustic scrubbing solution | 94.2 |
| Total | 305.0 |
| Bromine in charge | 310.0 |

*Example 2*

These examples compare the nitric acid oxidation of (1,2-dibromoethyl)benzene where the gas stream employed is (A) air and (B) nitrogen.

A

The oxidation of (1,2-dibromoethyl)benzene was conducted in the same equipment and in a similar manner to Example 1. The data for the reaction are contained in the accompanying table. It is to be noted that the rate of flow of air is less than in the preceding example, with the result that the amount of alpha,alpha-dibromoacetophenone in the product is larger.

Approximately 186 grams of solid containing a large proportion of alpha-bromoacetophenone crystallized out of 326 grams of crude washed organic product. From 142 grams of the above solid, there was obtained by recrystallizing from ethyl alcohol, nearly 115 grams of alpha-bromoacetophenone melting from 49.5° to 50.0° C. This represents a recovery after recrystallization of 46 weight per cent alpha-bromoacetophenone based on the total washed organic product.

B

In Example 2B, nitrogen was substituted for air in the oxidation of (1,2-dibromoethyl)benzene which was otherwise conducted in accord with the procedure and similar to the conditions of Example 2A. In both of these examples, all of the (1,2-dibromoethyl)benzene was hydrolyzed and nearly the same per cent by weight of alpha,alpha-dibromoacetophenone was obtained. However, less of the hydrolysis product $$(C_6H_5 \cdot CHOHCH_2Br)$$

and less HBr were oxidized in Example 2B in which nitrogen was employed. This demonstrates that the oxygen containing (air) stream aids in the oxidation reaction, possibly by oxidizing NO back to $NO_2$ according to the following equations:

$$2NO + O_2 \rightarrow 2NO_2$$

$$3NO_2 + H_2O \rightarrow 2HNO_3 + NO$$

The appended table contains the data for the reaction.

| | 2A (Air) | 2B (Nitrogen) |
|---|---|---|
| Charge: | | |
| (1,2-dibromoethyl)benzene _____ grams __ | 400 | 498 |
| Conc. nitric acid (Sp. Gr. 1.4) _____ ml __ | 50 | 70 |
| Water _____ ml __ | 500 | 500 |
| Monochlorobenzene _____ ml __ | 40 | 25 |
| Mole ratio $HNO_3/C_6H_5 \cdot CHBrCH_2Br$ | 0.52 | 0.57 |
| Flow of Gas _____ liters/min __ | 0.5 | 0.5 |
| Temperature _____ ° C __ | 95 | 95 |
| Duration of $HNO_3$ Addition _____ min __ | 360 | 270 |
| Duration of Run _____ min __ | 360 | 300 |
| Organic Product _____ grams __ | 330 | 415 |
| alpha-(bromomethyl)benzyl alcohol wt. percent __ | 15 | 53 |
| alpha-bromoacetophenone _____ wt. percent __ | 60 | 22 |
| alpha,alpha-dibromoacetophenone wt. percent __ | 25 | 24 |
| Bromine Balance: | | |
| Washed organic product _____ grams __ | 134 | 173 |
| Aqueous nitric acid _____ do __ | 26 | 98 |
| Caustic scrubbing solution [1] _____ do __ | 75 | 6 |
| Grams _____ | 235 | 277 |
| Bromine in Charge _____ grams __ | 242 | 301 |

[1] The vent gas was scrubbed in aqueous sodium hydroxide.

*Example 3*

In this example, the oxidation of (1,2-dibromoethyl)benzene was accomplished by charging all of the nitric acid into the reaction vessel at once. Since bromine was evolved at a rate much greater than it could effectively be removed from the reaction mixture, considerable alpha-bromoacetophenone was brominated to alpha,alpha-dibromoacetophenone.

The same apparatus used in the preceding examples was charged with 100 grams (1,2-dibromoethyl)benzene, 500 ml. water, 50 ml. nitric acid (1.4 specific gravity), and 10 ml. monochlorobenzene. Air was bubbled through the reaction mixture at a rate of 0.5 liter per minute while the temperature thereof was raised to approximately 100° C. in less than 30 minutes. Mechanical agitation was started when the (1,2-dibromoethyl)benzene melted. A large amount of bromine was evolved as the temperature approached 100° C. Air was blown through the hot agitated mixture for a period of 450 minutes.

The organic layer was separated from the aqueous nitric acid layer and washed with water. The washed organic weighing 83.0 grams was then fractionally distilled at 0.3 to 0.8 mm. Hg absolute pressure. In addition to 6.4 grams of monochlorobenzene, the composition and distribution of the organic product were as follows:

| | Weight per cent |
|---|---|
| Alpha-(bromomethyl)benzyl alcohol | 12.3 |
| Alpha-bromoacetophenone | 41.9 |
| Alpha, alpha-dibromoacetophenone | 45.8 |

*Example 4*

This example illustrates the oxidation of a (1,2-dihaloethyl)benzene preponderantly to a dihalomethyl phenyl ketone.

The equipment of Example 1 was charged with 100 grams of (1,2-dibromoethyl)benzene and 450 ml. of water. Heat was then applied to bring the temperature of the charge to about 100° C. No gas stream was blown through the reaction mixture and the only agitation was that attributable to boiling. Concentrated nitric acid of 1.42 specific gravity was rapidly added to the reaction vessel until 150 ml. had been added. Heating was continued for a period of 5 hours.

The washed organic product weighed 92 grams and contained 53.6 weight per cent bromine. Its composition was found to be approximately 95 weight per cent alpha,alpha-dibromoacetophenone and 5 weight per cent benzoic acid.

*Example 5*

This example describes the oxidation of meta-(1,2-dibromoethyl)toluene.

The same equipment used in the preceding examples was charged with 183 grams of meta-(1,2-dibromoethyl)-toluene and 500 ml. of water. The reaction mixture was heated to approximately 100° C. and a stream of air at a rate of 3 liters a minute was bubbled through the mixture. Nitric acid of 1.42 specific gravity was added dropwise to the mechanically agitated mixture until 70 ml. of the acid had been added during a period of 40 minutes. During this time, the air rate had been increased to 6 liters a minute. The refluxing mixture was blown with air at a rate of 2.5 liters for 115 minutes after the addition of the nitric acid.

Of the washed organic product weighing 159 grams, a portion weighing 147 grams was fractionally distilled at 0.8 to 2.0 mm. Hg absolute pressure. The distillate was about equally divided into two fractions.

Three fourths of the lower boiling fraction distilled at 97° C. at 0.8 mm. Hg absolute pressure and was found to contain 39.6 weight per cent bromine. Infra-red analysis gave its probable composition as a mixture of alpha-(bromomethyl)-m-methyl-benzyl alcohol (m-CH$_3$·C$_6$H$_4$·CHOHCH$_2$Br)

and alpha-bromomethyl-m-methyl-acetophenone (m-CH$_3$·C$_6$H$_4$·COCH$_2$Br)

No crystals could be formed by supercooling in solid carbon dioxide.

Two thirds of the higher boiling fraction distilled at 130° C. at 1.5 to 2.0 mm. Hg absolute pressure and contained 52.7 weight per cent bromine. Its probable composition by infra-red analysis was alpha,alpha-(dibromomethyl)-m-methylbenzyl alcohol (m-CH$_3$·C$_6$H$_4$·CHOHCHBr$_2$)

and alpha,alpha-dibromomethyl-m-methyl-acetophenone (m-CH$_3$·C$_6$H$_4$·COCHBr$_2$)

A portion of this material upon standing formed waxy crystals melting at 70° to 72° C. whose probable composition by infra-red analysis was alpha,alpha-(dibromomethyl)-m-methyl-benzyl alcohol (m-CH$_3$·C$_6$H$_4$·CHOHCHBr$_2$)

The following bromine balance was obtained for the oxidation of meta-(1,2-dibromoethyl)toluene:

|  | Grams |
|---|---|
| Washed organic product | 72.7 |
| Aqueous nitric acid | 2.6 |
| Caustic scrubbing solution | 30.7 |
| Total | 106.0 |
| Bromine in charge | 105.2 |

We claim:
1. In a method of preparing a halomethyl aromatic ketone corresponding to the general formula:

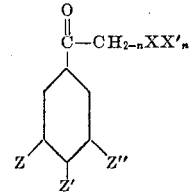

wherein X and X' are independently selected from the group consisting of bromine and chlorine, $n$ is an integer from 0 to 1, and Z, Z' and Z" are independently selected from the group consisting of hydrogen, bromine, chlorine, alkyl, and alkoxy, each of said alkyl and alkoxy groups containing no more than two carbon atoms, the step which comprises heating with aqueous nitric acid of not greater than 70 weight percent concentration in the liquid phase at a reaction temperature, a compound corresponding to the general formula:

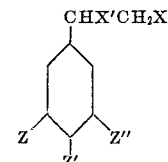

wherein X, X', Z, Z' and Z" are as described above.

2. A method according to claim 1 wherein the reaction temperature is above 50° C.

3. In a method of preparing alpha-bromoacetophenone and alpha,alpha-dibromoacetophenone, the step which comprises reacting (1,2-dibromoethyl)benzene with aqueous nitric acid containing water in an amount at least equal in weight to the (1,2-dibromoethyl)benzene in the liquid phase at a temperature above 50° C.

4. In a method of preparing alpha-bromo-m-methyl-acetophenone and alpha,alpha-dibromo-m-methyl-acetophenone, the step which comprises reacting meta-(1,2-dibromoethyl) toluene with aqueous nitric acid containing water in an amount at least equal in weight to the meta-(1,2-dibromoethyl)toluene in the liquid phase at a temperature above 50° C.

5. In a method of preparing alpha-bromoacetophenone, the step which comprises reacting dilute aqueous nitric acid with (1,2-dibromethyl)benzene in the liquid phase at a temperature above 80° C. while passing an inert gas through the reacting mixture, and thereafter separating alpha-bromoacetophenone from the reaction products.

6. In a method of preparing alpha-bromoacetophenone, the step which comprises reacting dilute aqueous nitric acid with (1,2-dibromoethyl)benzene in the liquid phase at a temperature above 80° C. while passing an oxygen containing gas through the reacting mixture, and thereafter separating alpha-bromoacetophenone from the reaction products.

7. A method according to claim 6 wherein the oxygen containing gas is air.

8. A method according to claim 7 wherein the flow of air is sufficiently great to rapidly and effectively remove the liberated bromine from the reacting mixture.

References Cited in the file of this patent

UNITED STATES PATENTS

| 2,372,562 | Emerson et al. | Mar. 27, 1945 |
| 2,382,867 | Emerson et al. | Aug. 14, 1945 |
| 2,619,505 | Wilkinson | Nov. 25, 1952 |